April 29, 1952
E. J. HANDLEY
2,594,429
PIPE-LIFTING DEVICE
Filed Oct. 17, 1949
2 SHEETS—SHEET 1
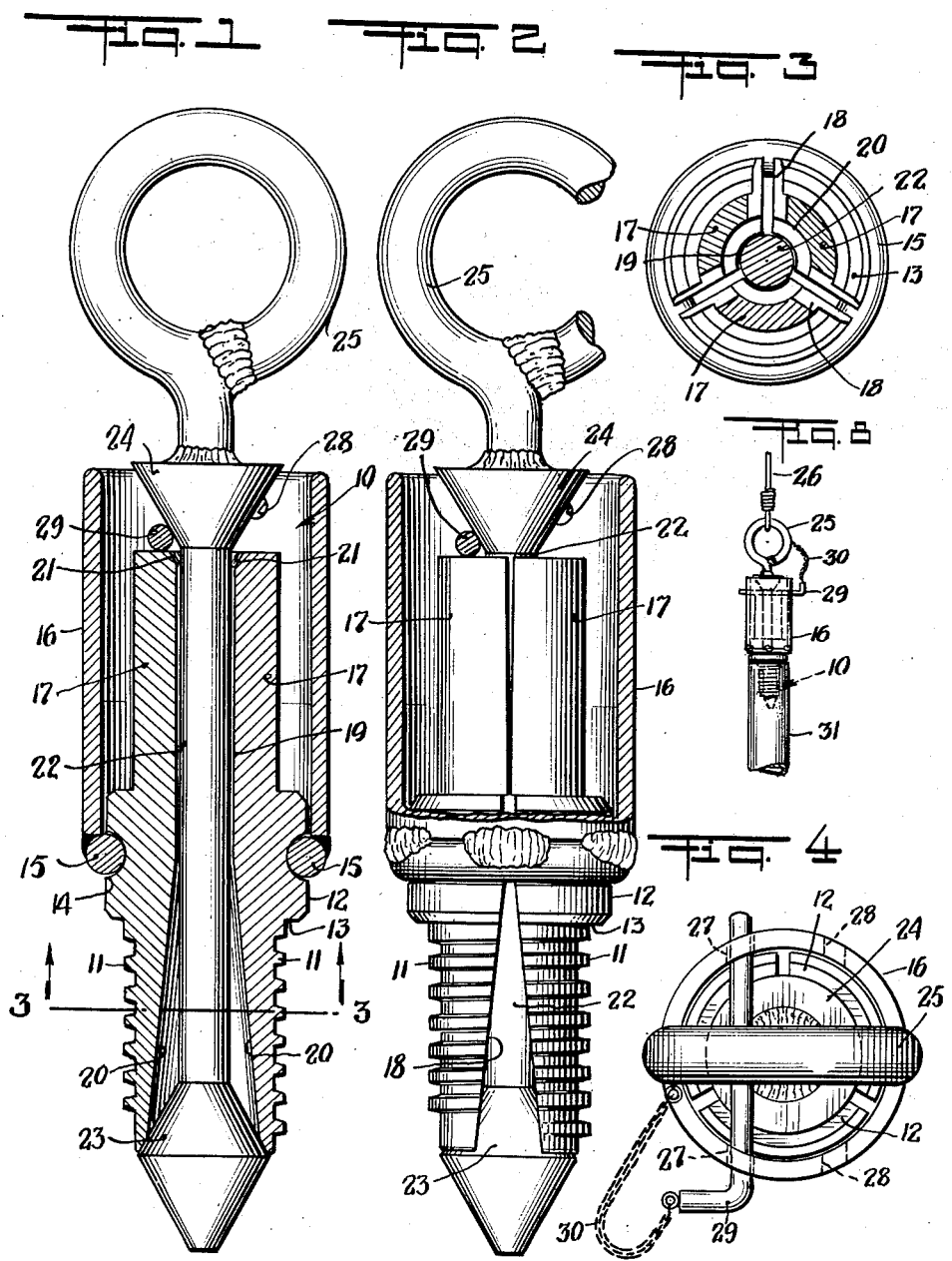
INVENTOR
E. J. Handley
BY
ATTORNEY

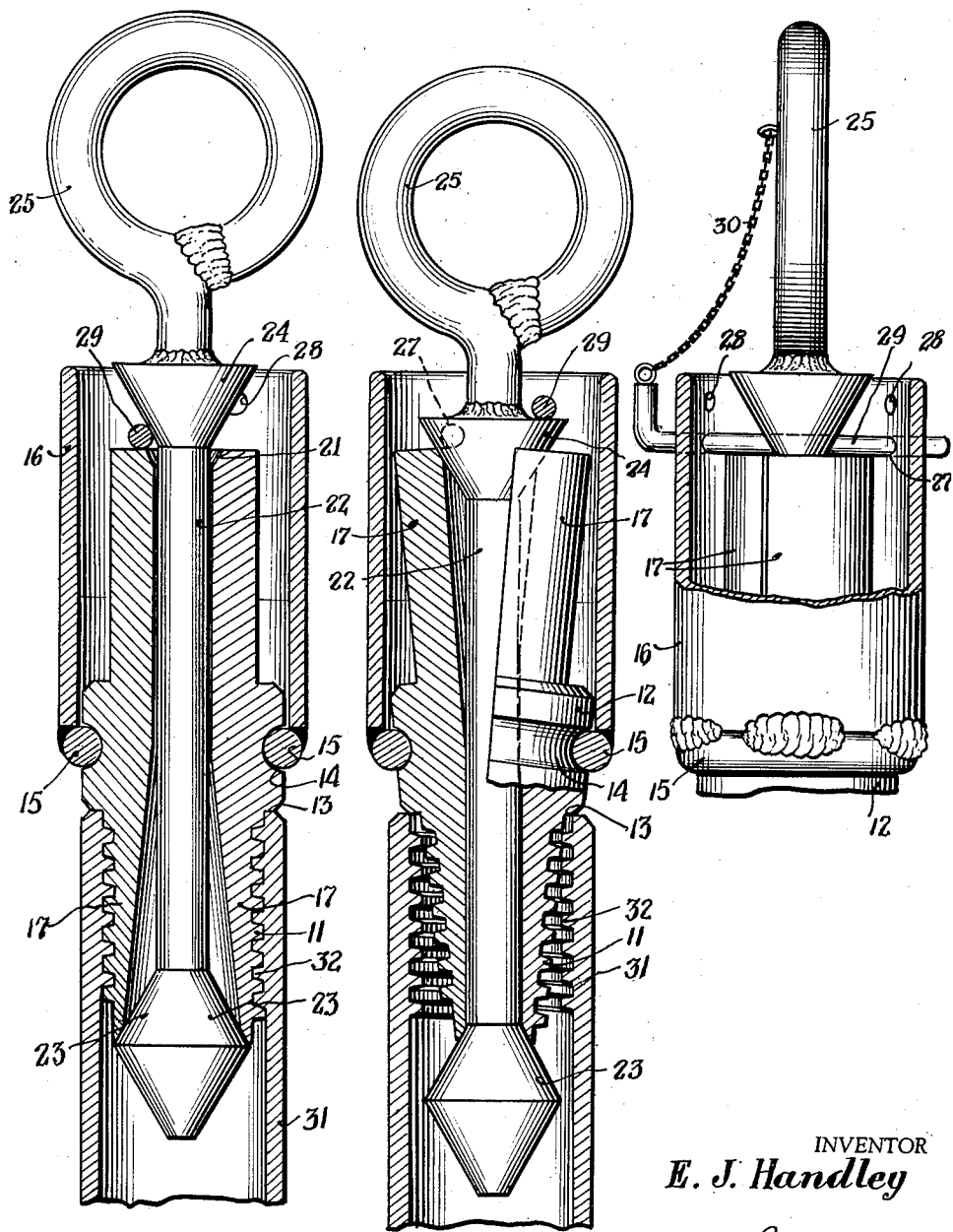

Patented Apr. 29, 1952

2,594,429

UNITED STATES PATENT OFFICE 2,594,429

PIPE-LIFTING DEVICE

Ernest Jack Handley, Tulsa, Okla., assignor to Century Geophysical Corporation, a corporation of Delaware Application October 17, 1949, Serial No. 121,774

7 Claims. (Cl. 294—96)

1

This invention relates to a lifting device or lifting plug adapted for use in lifting sections of drill pipe and the like from a well bore.

Pipe sections, particularly of the "external flush" type, as the name connotes, have no external projections or shoulders for support on the more conventional externally attached pipe elevators which are normally employed to withdraw pipe sections from a well bore. With this type of pipe, it is ordinarily necessary to employ a hoisting device which may be inserted into the upper end of the pipe section and suitably connected therein, generally to the internal threads ordinarily present, to enable the sections to be withdrawn from the well. Conventional hoisting devices for such pipe commonly comprise a male-threaded pin member which is screwed into the internal or box threads at the upper of the pipe section and by means of the resulting threaded connection are employed to lift the pipe from the well. Employment of such conventional devices necessarily involves the operations of screwing the plug into the pipe end and then unscrewing it to release the plug and prepare it for connection to the next section of the pipe. This is a time-consuming and generally unsatisfactory operation.

The present invention has for its principal objects the provision of an improved form of lifting plug which is adapted for quick connection to and release from the pipe sections; which is simple and rugged in construction; which does not damage the pipe threads; and which is more or less automatic in operation requiring a minimum of effort on the part of the operator in its employment.

A more specific object is the provision of a tubular plug having external threads matching the pipe threads and composed of pivoted segments whereby the threads on the plug may be moved radially rather than rotatively, into and out of direct engagement with the pipe threads.

An additional object is the provision of a segmental externally threaded plug in which the segments are suitably pivoted to collapse and expand the threaded portions relative to the longitudinal axis of the plug by the relative axial movement of an internal mandrel.

A further object is the provision of auxiliary locking means for holding the plug segment in the collapsed or expanded position, as may be desired.

Other and more specific objects and advantages of this invention will become apparent from the following detailed description when read in conjunction with the accompanying drawing which illustrates a useful embodiment in accordance with this invention.

In the drawing:

Fig. 1 is a longitudinal sectional view of the device in expanded or pipe-gripping position;

Fig. 2 is an elevational view of the device in the position illustrated in Fig. 1 having some of the parts broken away for purposes of better illustration;

Fig. 3 is a cross-sectional view along line 3—3 of Fig. 1;

Fig. 4 is a plan view of the upper end of the device;

Fig. 5 is a view similar to Fig. 1 showing the device in engaged position in the end of a pipe section;

Fig. 6 is a view similar to Fig. 5 but showing the device in dis-engaged or collapsed position in a pipe end;

Fig. 7 is a fragmentary elevational view of the upper end of the device turned at right angles to the positions shown in Figs. 1, 2 and 5, and having part of the housing element broken away; and Fig. 8 is a fragmentary view showing the device in the position when engaged in withdrawing a pipe section and attached to a hoisting cable.

Referring to the drawings, the device in accordance with this invention comprises a generally tubular plug body, designated generally by the numeral 10, having external threads 11 cut or formed on its lower section. Threads 11 are of a shape and dimensions adapted to match the internal threads of a pipe joint into which the plug body is to be inserted. Immediately above the threads 11 an annular enlargement 12 is provided about the exterior of the plug body providing a downwardly facing annular shoulder 13 forming a stop adapted to contact the outer end face of the pipe joint when the plug body is inserted to thereby limit the extent of insertion therein of the plug body. Enlargement 12 is provided with a circumferential groove 14 adapted to form a journal for a pivot ring 15. The latter is rigidly attached to the lower end of a tubular housing 16 which concentrically surrounds the upper portion of the plug body and is of somewhat larger internal diameter than the external diameter of the plug body and enlargement 12.

Plug body 10 is composed of a plurality of arcuate segments 17 formed ordinarily by splitting plug body 10 longitudinally at a plurality of angularly spaced points. Plug body 10 will be composed of at least two such segments but may be composed of more than two and preferably will be composed of at least three segments. In practice plug body 10 will be constructed from a suitable tubular blank which may be completely machined, including the formation of threads 11, enlargement 12 and groove 13, before being split so that when assembled in housing 16 in the circular arrangement shown, the segments will be positioned to form a tubular structure of substantially the same radial dimensions as the original blank. The adjacent edges of segments 17 are bevelled downwardly and outwardly through the portions carrying threads 11 from a point opposite the pivot formed by groove 14 and ring 15 so as to provide a triangular space 18 between each pair of adjacent segments as shown particularly in Fig. 2. The inner walls 19 of the threaded portions of segments 17 are also bevelled downwardly and outwardly from points opposite groove 14, whereby the lower portion of bore 20 of the plug body will have a generally conical conformation diverging downwardly toward the lower end of the plug body. (See Fig. 1.) The portions of the adjacent edges of segments 17 above the level of the pivot formed by groove 14 and ring 15 may be made parallel or slightly divergent, if desired. The upper ends of segments 17 are bevelled outwardly from their inner edges at 21.

A cylindrical stem 22 extends through bore 20 of the plug body and is provided at its lower end with an upwardly tapering conical expander 23 and at its upper end with a downwardly facing conical expander 24. The major diameters of each of the expanders is made greater than the diameter of bore 20. With this construction, it will be evident that upon upward axial movement of stem 22 relative to the plug body, lower expander 23 will move upwardly into bore 20 between the lower ends of segments 17 and urge them outwardly, while downward movement of stem 22 will force upper expander 24 between the upper ends of the segments to urge them outwardly. A suitable attachment means, such as an eye 25, is rigidly connected to upper expander 24 for connection of a lifting rope or cable 26 to the device (see Fig. 8). Two pairs of registering openings 27—27 and 28—28, respectively, are provided in the wall of housing 16 for the reception of a locking pin 29 which may be inserted transversely of the housing through either pair of openings as may be required in connection with the operation of the device as will be described hereinafter. Openings 27—27 are positioned immediately above the upper end of plug body 10 and openings 28—28 at a somewhat higher elevation. A flexible connection 30, such as a chain may be employed to provide means for retaining locking pin 29 in attachment to eye 25. (See Figs. 4, 7 and 8.)

The above-described device operates in the following manner: With eye 25 connected to hoisting cable 26 (Fig. 8), housing 16, having segments 17 pivotally connected thereto, will be moved upwardly relative to stem 22 whereby the upper ends of segments 17 will be forced upwardly and outwardly over upper expander 24, the lower threaded portions of the segments being thereby rotated or rocked about the pivot formed by ring 15 to the inward or collapsed position illustrated in Fig. 6, lower expander moving downwardly relative to the lower ends of the segments to permit their movement upwardly and inwardly along the tapered surface of the expander. Locking pin 29 will then be inserted through openings 28—28 above the upper end of upper expander 24 thereby holding the parts of the device in the inoperative or collapsed position. The plug body with the threaded portion thus collapsed will then be inserted into the end of a pipe 31 having internal threads 32 to be engaged by threads 11 on the plug body. The collapsed condition of the plug body allows it to be inserted easily and without scraping threads 32. When shoulder 13 strikes the upper end of pipe 31, threads 11 will be in position to engage threads 32 when the segments are expanded. It will be understood that the distance between the uppermost thread 11 and shoulder 13 will have been dimensioned in accordance with the known distance between the upper end of pipe 31 and the first of the threads 32 therein, which dimension is normally a standard one for all sizes of conventional drill pipe or tool joints. When the collapsed plug has thus been inserted, locking pin 29 will be withdrawn and tension taken in cable 26. This allows stem 22 to move upwardly through the bore of the plug body, moving lower expander 23 upwardly between segments 17 to effect radial expansion of the threaded portions of the segments into seating engagement with threads 32. This upward movement will, of course, be accompanied by correspondingly upward movement of upper expander 24 out of engagement with the upper ends of segments 17, the parts of the device assuming the positions shown in Figs. 1, 2 and 5, threads 11 being fully engaged with threads 32 of the pipe end, as shown. Locking pin 29 will then be inserted in openings 27—27 to hold the plug segments in the expanded and thread-engaging positions as shown in Fig. 5 and upon appropriate pull on hoisting cable 26, the pipe may be drawn from the well. The upward pull applied to stem 22 opposed by the weight of the attached pipe will act to force lower expander upwardly relative to the threaded portions of segments 17 and thereby maintain them in the engaged position in threads 32.

When a pipe section has been withdrawn, locking pin 29 will again be withdrawn releasing the parts of the plug so that segments 17 may again be collapsed to permit the device to be withdrawn from the pipe and prepared for attachment to the next section of pipe.

With the described arrangement, it will be evident that the hoisting device in accordance with this invention may be attached and disconnected in a very simple and effective manner, making use of the pipe threads as a hoisting connection without danger of damage to the threads.

It will be understood that various alterations and changes may be made in the details of the illustrative embodiment within the scope of the appended claims but without departing from the spirit of this invention.

What I claim and desire to secure by Letters Patent is:

1. A pipe lifting device, comprising, a generally tubular body composed of circularly arranged complementary arcuate segments, the lower ends of which are externally threaded to mesh with the internal threads of a pipe end into which said body is insertible, a bearing member encircling said body and rockably supporting said arcuate segments intermediate their opposite ends, and expander means movable axially of the bore of said body into and out of expansive engagement with said opposite ends.

2. A pipe lifting device, comprising, a generally tubular body composed of circularly arranged complementary arcuate segments, the lower ends of which are externally threaded to mesh with the internal threads of a pipe end into which said body is insertible, a bearing member encircling said body and rockably supporting said arcuate segments intermediate their opposite ends, expander means movable axially of the bore of said body into and out of expansive engagement with said opposite ends, and locking means for selectively locking said arcuate segments in expanded or contracted position relative to said expander means.

3. A pipe lifting device, comprising, a generally tubular body composed of circularly arranged complementary arcuate segments, the lower ends of which are externally threaded to mesh with the internal threads of a pipe end into which said body is insertible, the adjacent longitudinal edges of said arcuate segments extending along the threaded portions thereof diverging downwardly and outwardly relative to said edges, a bearing member encircling said body and rockably supporting said arcuate segments intermediate their opposite ends, and expander means movable axially of the bore of said body into and out of expansive engagement with said opposite ends.

4. A pipe lifting device, comprising, a generally tubular body composed of circularly arranged complementary arcuate segments, the lower ends of which are externally threaded to mesh with the internal threads of a pipe end into which said body is insertible, a bearing member encircling said body and rockably supporting said arcuate segments intermediate their opposite ends, a stem movable axially through the bore of said body, and oppositely tapering conical expander elements carried by the opposite ends of said stem movable into and out of expansive engagement with said opposite ends in accordance with relative axial movement between said stem and said body.

5. A pipe lifting device, comprising, a generally tubular body composed of circularly arranged complementary arcuate segments, the lower ends of which are externally threaded to mesh with the internal threads of a pipe end into which said body is insertible, a tubular housing enclosing the upper portion of said body, a circular bearing member mounted in said housing and rockably supporting said arcuate segments intermediate their ends, a stem movable axially through the bore of said body, oppositely tapered conical expander elements carried by the opposite ends of said stem movable into and out of expansive engagement with said opposite ends in accordance with relative axial movement between said stem and said body, and locking means removably disposed between said housing and said stems and said arcuate segments to selectively maintain said arcuate segments in expanded or contracted position relative to said expander means.

6. A pipe lifting device, comprising, a generally tubular body composed of circularly arranged complementary arcuate segments, the lower ends of which are externally threaded to mesh with the internal threads of a pipe end into which said body is insertible, the adjacent longitudinal edges of said arcuate segments extending along the threaded portions thereof diverging downwardly and outwardly relative to said edges, an integral annular enlargement on the exterior of said body immediately above said threaded portion, a circular recess in the outer periphery of said enlargement, a tubular housing concentrically enclosing the upper end of said body, a circular pivot member mounted in said housing and extending circumferentially into said recess whereby to rockably support said segments intermediate their opposite ends, and expander means movable axially of the bore of said body into and out of expansive engagement with said opposite ends.

7. A pipe lifting device, comprising, a generally tubular body composed of circularly arranged complementary arcuate segments, an integral annular enlargement on the exterior of said body intermediate the ends thereof engageable with the upper end of a pipe into which said body is inserted to limit the extent of insertion therein of said body, the portions of said segments below and immediately adjacent said enlargement being externally threaded to mate with internal threads in said pipe end, a circular recess in the outer periphery of said enlargement, a tubular housing concentrically enclosing the upper end of said body, a circular pivot member mounted on the lower end of said housing and extending circumferentially into said recess whereby to rockably support said segments intermediate their upper ends, a stem movable axially through the bore of said body, oppositely tapered conical expander elements mounted on the opposite ends of said stem movable into and out of expansive engagement with the opposite ends of said body in accordance with relative axial movement between said stem and said body, and locking means removably disposed between said housing and said stem and said arcuate segments to selectively maintain said arcuate segments in expanded or contracted position relative to said expander means.

ERNEST JACK HANDLEY.

REFERENCES CITED

The following references are of record in the file of this patent:

UNITED STATES PATENTS

| Number | Name | Date |
|---|---|---|
| 1,777,591 | Thomas | Oct. 7, 1930 |
| 1,801,456 | Pryor | Apr. 21, 1931 |